United States Patent
Niwano et al.

(10) Patent No.: US 6,404,468 B1
(45) Date of Patent: *Jun. 11, 2002

(54) LIQUID CRYSTAL DISPLAY UNIT

(75) Inventors: Yasunori Niwano; Kazuhiro Kobayashi, both of Hyogo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/227,827

(22) Filed: Jan. 11, 1999

(30) Foreign Application Priority Data

Jul. 16, 1998 (JP) .......................... 10-201697

(51) Int. Cl.$^7$ ............................. G02F 1/1335
(52) U.S. Cl. .......................... 349/64; 349/62
(58) Field of Search ................ 349/58, 57, 62–65; 362/26, 27, 30, 31

(56) References Cited

U.S. PATENT DOCUMENTS

| | | | |
|---|---|---|---|
| 5,107,356 A | * | 4/1992 | Castleberry ................ 359/93 |
| 5,557,433 A | * | 9/1996 | Maruyama et al. ........... 359/41 |
| 5,592,332 A | * | 1/1997 | Nishio et al. ............... 359/91 |
| 5,694,186 A | * | 12/1997 | Yanagawa et al. .......... 349/106 |
| 5,719,649 A | * | 2/1998 | Shono et al. ................ 349/65 |
| 5,851,062 A | * | 12/1998 | Shinohara et al. ........... 362/31 |
| 5,877,829 A | * | 3/1999 | Okamoto et al. ............. 349/64 |
| 5,982,540 A | * | 11/1999 | Koike et al. ................. 349/62 |

FOREIGN PATENT DOCUMENTS

| | | |
|---|---|---|
| JP | 5-89827 | 4/1993 |
| JP | 5-173134 | 7/1993 |
| JP | 5-203950 | 8/1993 |
| JP | 7-77690 | 3/1995 |
| JP | 8-22000 | 1/1996 |
| JP | 8-122757 | 5/1996 |
| JP | 8-179317 | 7/1996 |
| JP | 8-254712 | 10/1996 |
| JP | 08304631 A | 11/1996 |
| JP | 8-335044 | 12/1996 |
| JP | 9-113902 | 5/1997 |
| JP | 09258269 A | 10/1997 |
| JP | 10062788 A | 3/1998 |

* cited by examiner

Primary Examiner—William L. Sikes
Assistant Examiner—Dung Nguyen
(74) Attorney, Agent, or Firm—McDermott, Will & Emery

(57) ABSTRACT

A liquid crystal display unit having uniformity of luminance and color in a region with a large angle of view is obtained.

The liquid crystal display unit includes: a liquid crystal holding member having a display surface and a back surface; first and second electrodes formed on planes which are almost parallel to the back surface of liquid crystal holding member for generating an electric field which is almost parallel to the back surface; and a light quantity adjusting member formed on the side of the back surface of liquid crystal holding member for decreasing a quantity of light diagonally directed from the back surface through the display surface.

33 Claims, 14 Drawing Sheets

LIQUID CRYSTAL DISPLAY UNIT

BACKGROUND OF THE INVENTION

1. Field of the Invention

The present invention relates to liquid crystal display units and, more specifically to a liquid crystal display unit capable of enhancing visibility at a large angle of view.

2. Description of the Background Art

A Liquid crystal display unit has conventionally been known as one type of display unit. One of major technological subjects of the liquid crystal display unit is to increase its angle of view. A liquid crystal display unit which has an IPS mode (In-Plane Switching mode) as one of modes for obtaining such large angle of view has been disclosed for example in Japanese Patent Laying-Open No. 8-254712. The liquid crystal display unit of an active matrix type having the IPS mode makes a direction of an electric field applied to a liquid crystal parallel to a substrate.

FIG. 18 is a schematic cross-sectional view showing a conventional liquid crystal display unit having an IPS mode, where a voltage is not applied to its electrode. Further, FIG. 19 is a schematic plan view showing the liquid crystal display unit having the IPS mode shown in FIG. 18. Referring to FIGS. 18 and 19, the liquid crystal display unit having the IPS mode will be described.

Referring to FIG. 18, the liquid crystal display unit having the IPS mode is provided with a back light member 101 and a liquid crystal display 103. Liquid crystal display 103 is formed above back light member 101. Liquid crystal display 103 includes polarizer 104a and 104b, glass substrates 113a and 113b, electrodes 106a and 106b, a source line 109, orientation films 107a and 107b and liquid crystal molecules 108a and 108b. Glass substrate 113a is formed on polarizer 104a. Linear electrodes 106a, 106b and source line 109 are respectively formed on and above glass substrate 113a. Orientation film 107a for adjusting an orientation direction of liquid crystal molecules 108a and 108b (a major axis direction of liquid crystal molecules 108a and 108b) is formed above electrodes 106a and 106b. Glass substrate 113b is formed above orientation film 107a with a liquid crystal including liquid crystal molecules 108a and 108b interposed. The other orientation film 107b is transferred on glass substrate 113b. Polarizer 104b is formed on glass substrate 113b.

Here, as shown in FIG. 19, when the voltage is not applied to electrodes 106a and 106b, the orientation direction of liquid crystal molecules 108a and 108b is adjusted to have some angle with respect to a direction in which electrodes 106a and 106b extend. It is noted that anisotropy of dielectric constant of the liquid crystal is assumed positive.

Referring further to FIG. 18, polarizer 104a and 104b are arranged with their transmission axes orthogonal to each other. It is noted that the transmission axes mentioned here correspond to directions of vibration components of light allowed to be transmitted through polarizer 104a and 104b. Then, the transmission axis of polarizer 104a positioned between back light member 101 and liquid crystal molecules 108a, 108b is aligned with the orientation direction of liquid crystal molecules 108a and 108b when the voltage is not applied to electrodes 106a and 106b. When the voltage is not applied to electrodes 106a and 106b, birefringence does not occur at liquid crystal molecules 108a and 108b. So the light directed from back light member 101 through polarizer 104a dose not transmit the polarizer 104b. As a result, a black screen (hereinafter represents a state in which a screen appears black) is achieved.

FIG. 20 is a schematic cross sectional view showing the liquid crystal display unit having the IPS mode shown in FIG. 18, where the voltage is applied to the electrode. Further, FIG. 21 is a schematic plan view showing the liquid crystal display unit shown in FIG. 20. Referring to FIGS. 20 and 21, an operation of the liquid crystal display unit having the IPS mode when the voltage is applied to the electrode is described.

Referring to FIGS. 20 and 21, when the voltage is applied to electrodes 106a and 106b, an electric field is formed in the direction indicated by an arrow 110. When such electric field is formed, liquid crystal molecules 108a and 108b change their orientation directions on planes which are almost parallel to the surfaces of orientation films 107a and 107b. In this case, the birefringence occurs at liquid crystal molecules 108a and 108b. So the light directed from back light member 101 through polarizer 104a can transmit the polarizer 104b. As a result, a white screen (hereinafter represents a state in which the screen appears white) is achieved.

It is noted that although the liquid crystal having positive anisotropy of dielectric constant is used here, a liquid crystal having negative anisotropy of dielectric constant may be used. In this case, the orientation directions of liquid crystal molecules 108a and 108b in the case where the voltage is not applied to electrodes 106a and 106b are adjusted to have some angles with respect to electric field direction 110.

As shown in FIG. 18, when the light is directed in the direction which is perpendicular to the surfaces of polarizer 104a and 104b which are arranged with their transmission axes orthogonal to each other, the light in the perpendicular direction is shielded. However, when the light is directed in a direction which is diagonal with respect to the surfaces of polarizer 104a and 104b, that is, when an angle of view Θ is large, there would be some light transmitting through polarizer 104a and 104b (leakage light). Here, angle of view Θ is defined as shown in FIG. 22. FIG. 22 is a diagram showing a relation between angle of view Θ and electric field direction 110 generated in the liquid crystal display unit having the IPS mode.

Referring to FIG. 22, assume that an x axis is almost parallel to electric field direction 110. Then, a y axis is set on a plane which is almost parallel to the surfaces of polarizer 104a and 104b (with reference to FIG. 20). Further, a z axis is set in the direction which is perpendicular to an xy plane and also in the direction from polarizer 104a toward 104b. Then, an azimuth Φ is defined on the xy plane with respect to the electric field direction. Finally, on a plane defined by the direction determined by azimuth Φ and the z axis, an angle of view Θ with respect to the z axis is defined.

FIG. 23 is a graph showing a relation between a relative luminance and an angle of view of the light directed from the back light member. Referring to FIG. 23, even when angle of view Θ attains 80°, the relative luminance is about 50%, and the light is directed from the back light member diagonally with respect to the liquid crystal display.

Then, a relation between the angle of view, relative luminance and contrast ratio is measured in the liquid crystal display unit having the IPS mode shown in FIGS. 18 to 21. The result is shown in FIGS. 24 to 26.

FIG. 24 is a graph showing the relation between the relative luminance and the angle of view in the case of the white screen in the liquid crystal display unit having the IPS mode. FIG. 25 is a graph showing the relation between the relative luminance and the angle of view in the case of the black screen in the liquid crystal display unit having the IPS mode. FIG. 26 is a graph showing the relation between the contrast ratio and the angle of view in the liquid crystal display unit having the IPS mode.

Referring to FIG. 25, in the conventional liquid crystal display unit having the IPS mode shown in FIGS. 18 to 21, the relative luminance increases around points at which $\Theta=\pm 60°$ in the case of the black screen. This is because the light which is diagonally directed with respect to the liquid crystal display 103 is detected as leakage light. Thus, although uniform luminance should be obtained at any angle of view in the case of the black screen, the luminance differs from the angle of view as the relative luminance increases around the points at which $\Theta=\pm 60°$.

In addition, in this case, a transmission path in liquid crystal display 103 (with reference to FIG. 18) of the leakage light in the region with a large angle of view is longer than usual. As a result, retardation increases and the leakage light appears yellow. Therefore, in the region with a large angle of view, the color on the liquid crystal display unit is not sufficiently uniform.

As shown in FIG. 27, the above mentioned problem is particularly serious in the liquid crystal display unit such as the one having the IPS mode having the angle of view which is larger than that of the conventional liquid crystal display unit. FIG. 27 is a schematic diagram shown in conjunction with the problem of the region with the large angle of view. Referring to FIG. 27, while angle of view $\Theta$ of the conventional liquid crystal display unit is about $\pm 40°$, angle of view $\Theta$ of the above mentioned liquid crystal display unit having the IPS mode is about $\pm 80°$. The above mentioned problem is particularly serious in regions A and B having large angles of view shown in FIG. 27.

In addition, the light diagonally directed with respect to liquid crystal display 103 (with reference to FIG. 20) is scattered by a component of the liquid crystal display such as a spacer for increasing thickness of the region in which the liquid crystal is retained, and directed onto the front surface of liquid crystal display 103 from a region with disordered orientation of the liquid crystal near the spacer. As a result, as shown in FIG. 26, the contrast ratio at the front surface of liquid crystal display 103 (around the point at which $\Theta=0°$) is as low as 95.

SUMMARY OF THE INVENTION

An object of the present invention is to enhance uniformity of luminance and color in a region with a large angle of view in a liquid crystal display unit having an angle of view which is larger than that of a conventional unit.

It is another object of the present invention to enhance a contrast ratio when viewed form the front side in a liquid crystal display unit having an angle of view which is larger than that of a conventional unit.

A liquid crystal display unit according to one aspect of the present invention is provided with a liquid crystal holding member, first and second electrodes and a light quantity adjusting member. The liquid crystal holding member has a display surface and a back surface. The first and second electrodes are formed on planes which are almost parallel to the back surface of the liquid crystal holding member, and form an electric field which is almost parallel to the back surface. The light quantity adjusting member is formed on the side of the back surface of the liquid crystal holding member and decreases a quantity of light diagonally directed from the back surface through the display surface.

Thus, a quantity of diagonally directed leakage light in the case of black screen decreases by decreasing the quantity of light diagonally directed through the display surface of the liquid crystal display unit. As a result, when viewed from a large angle of view, luminance in the case of the black screen is prevented from becoming larger than that in the case where the display surface is viewed from the front side, so that uniformity of luminance is enhanced. In addition, the quantity of light having a long transmission path in the liquid crystal holding member by diagonally directing the light through the display surface can be decreased. Therefore, the problem of the light which appears yellow when viewed from the large angle of view is minimized, so that uniformity of color is enhanced.

A liquid crystal display unit according to another aspect of the present invention is provided with a glass substrate, first and second electrodes, a liquid crystal holding member, a light quantity adjusting member. The first and second electrodes are formed on the glass substrate almost parallel to each other. The liquid crystal holding member is formed on the first and second electrodes and has a display surface and a back surface. The light quantity adjusting member is formed on the side of the back surface of the liquid crystal holding member and decreases a quantity of light diagonally directed from the back surface through the display surface.

Thus, a quantity of diagonally directed leakage light in the case of black screen decreases by decreasing the quantity of light diagonally directed through the display surface of the liquid crystal display unit. As a result, when viewed from a large angle of view, luminance in the case of the black screen is prevented from becoming larger than that in the case where the display surface is viewed from the front side, so that uniformity of luminance is enhanced. In addition, the quantity of light having a long transmission path in the liquid crystal holding member by diagonally directing the light through the display surface can be decreased. Therefore, the problem of the light which appears yellow when viewed from the large angle of view is minimized, so that uniformity of color is enhanced.

The liquid crystal display unit according to be above mentioned aspect and another aspect may further be provided with a polarizing member having a transmission axis. The polarizing member may be formed between the liquid crystal holding member and the light quantity adjusting member. The light quantity adjusting member may decrease the quantity of the light diagonally directed from the back surface through the display surface from an azimuth which differs from the transmission axis.

Thus, by decreasing the quantity of the diagonally directed light from the azimuth which differs from the transmission axis which readily allows generation of leakage light, the quantity of the leakage light in the case of the black screen can more effectively be reduced when viewed from a large angle of view. As a result, uniformity of luminance when viewed from the large angle of view is further enhanced.

In the liquid crystal display unit according to the above mentioned aspect and another aspect, the azimuth which differs from the transmission axis may form an angle of 45° or 135° with respect to the transmission axis.

Here, the light directed from the azimuth which forms the angle of 45° or 135° with respect to the transmission axis may turn to leakage light. As the quantity of the light directed from the azimuth which readily allows generation of leakage light can be decreased, uniformity of luminance and color when viewed from the large angle of view is particularly enhanced.

In the liquid crystal display unit according to the above mentioned aspect and another aspect, the light quantity adjusting member may include an orientation changing member for changing a direction of the diagonally directed light to a direction which is almost perpendicular to the display surface.

Thus, the quantity of the light which is directed almost perpendicularly to the display surface (in the direction which forms an angle of view of about 0°) can be increased. As a result, the contrast ratio when the display surface is viewed almost from the front side is enhanced.

In the liquid crystal display unit according to the above mentioned aspect and another aspect, the orientation changing member may be a condenser film.

The liquid crystal display unit according to the above mentioned aspect and another aspect may further be provided with a light conducting plate formed on the side of the back surface of the liquid crystal holding member, and the orientation changing member may be formed by processing the surface of the light conducting plate.

The liquid crystal display unit according to the above mentioned aspect and another aspect may further be provided with a light scattering member formed on the side of the display surface of the liquid crystal holding member.

As the direction of the part of the light which is directed perpendicularly to the display surface can be changed to the direction which is diagonal to the display surface by the light scattering member, luminance in the case of the white screen is enhanced when viewed from a large angle of view. As a result, when viewed from the large angle of view, while preventing leakage light in the case of the black screen, luminance in the case of the white screen is increased.

The liquid crystal display unit according to be above mentioned aspect may further be provided with a glass substrate having a surface almost parallel to the back surface. The glass substrate may be formed on a side of the back surface of the liquid crystal holding member. First and second electrodes may be formed on the surface of said glass substrate almost parallel to each other.

The liquid crystal display unit according to still another aspect of the present invention has an angle of view with respect to a display surface which is 40° or larger, and is provided with a means having a display surface and a back surface for holding a liquid crystal, and a light quantity adjusting means formed on the side of the back surface for decreasing a quantity of light diagonally directed from the back surface through the display surface.

Thus, the quantity of leakage light in the direction which forms a large angle of view is decreased. In addition, even when the display surface is viewed from the direction which forms the large angle of view, increase in luminance by the leakage light in the case of the black screen can be prevented. As a result, uniformity of luminance is enhanced. Further, as a quantity of light having a long transmission path in the liquid crystal by diagonally directing the light through the display surface can decrease, even when the diagonally directed light appears yellow by retardation, the problem of the yellow light is minimized and uniformity of color is enhanced.

The liquid crystal display unit according to the above mentioned still another aspect may further be provided with a polarizing means having a transmission axis for allowing transmission of light of the light directed from the back surface through the display surface which has a vibration component almost parallel to the transmission axis. The light quantity adjusting means may decrease the quantity of the light which is diagonally directed from the back surface through the display surface from an azimuth which is different from the transmission axis.

Thus, the quantity of the light diagonally directed from the azimuth which is different from the transmission axis readily allowing generation of leakage light is decreased, so that the leakage light is more effectively be prevented when viewed from the large angle of view. As a result, uniformity of luminance and color is more effectively be enhanced when viewed from a region having a large angle of view.

The liquid crystal display unit according to the above mentioned still another aspect may further be provided with a means for scattering light directed from the back surface through the display surface.

Accordingly, as the direction of the part of the light which is directed perpendicularly to the display surface is changed to the direction which is diagonal to the display surface, luminance in the case of the white screen can be increased when viewed from the large angle of view. As a result, when viewed from the large angle of view, while preventing generation of leakage light in the case of the black screen, luminance in the case of the white screen is increased.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Now, embodiments of the present invention will be described with reference to the drawings.

FIRST EMBODIMENT

Figure 1:
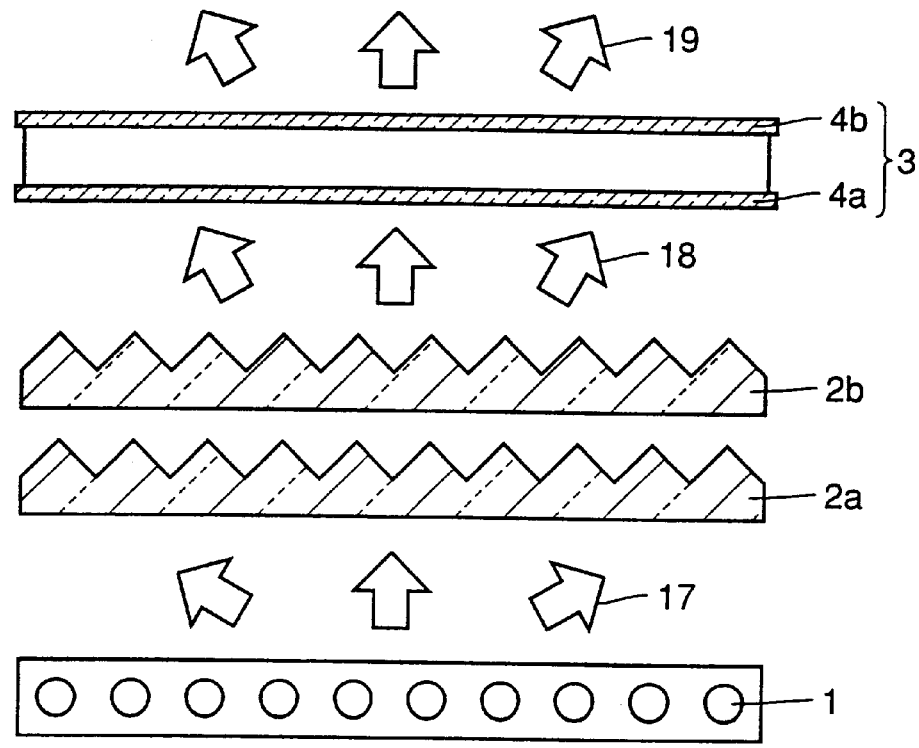
FIG. 1 is a schematic cross-sectional view showing a first embodiment of a liquid crystal display unit according to the present invention.

Referring now to FIG. 1, a liquid crystal display unit will be described.

As shown in FIG. 1, the liquid crystal display unit is provided with a back light member 1, lens films 2a and 2b and a liquid crystal display 3. Lens films 2a and 2b are formed above back light member 1. Liquid crystal display 3 is formed above lens films 2a and 2b. Liquid crystal display 3 is provided with polarizer 4a and 4b.

Figure 2:
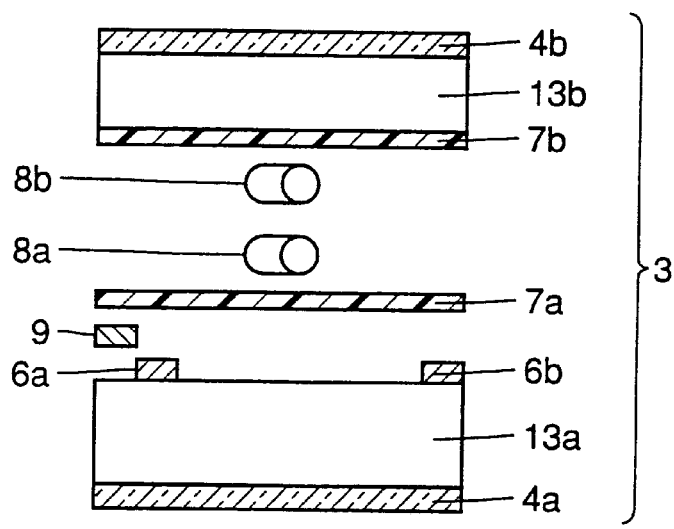
FIG. 2 is a schematic cross-sectional view showing a liquid crystal display of the liquid crystal display unit shown in FIG. 1.

Referring to FIG. 2, the structure of liquid crystal display 3 will be described.

As shown in FIG. 2, liquid crystal display 3 is provided with polarizer 4a and 4b, glass substrates 13a and 13b, electrodes 6a and 6b, a source line 9, orientation films 7a and 7b and liquid crystal molecules 8a and 8b.

Glass substrate 13a is formed on polarizer 4a. Electrodes 6a, 6b and a thin film transistor including source line 9 or the like are respectively formed on and above glass substrate 13a. Orientation film 7a is formed above electrodes 6a and 6b and source line 9. Orientation film 7a includes polyimide and is rubbed for alignment of orientation directions of liquid crystal molecules 8a and 8b. Orientation film 7b is formed above orientation film 7a through a liquid crystal including liquid crystal molecules 8a and 8b. Orientation film 7b also includes polyimide and has its surface rubbed. Glass substrate 13b is formed on orientation film 7b. A color filter is formed on glass substrate 13b. The directions in which orientation films 7a and 7b are rubbed are parallel to each other and set to form an angle of about 100° with respect to a direction 10 of an electric field (with reference to FIG. 3) formed by applying a voltage to electrodes 6a and 6b.

Further, referring to FIG. 2, anisotropy of dielectric constant of the liquid crystal positioned between orientation films 7a and 7b is positive. A cell gap of the region having the liquid crystal is 3.6 μm.

Referring FIG. 1, BEF-90 of Sumitomo 3M corporation is used for lens films 2a and 2b. The condensing directions of lens films 2a and 2b are respectively set parallel to and orthogonal to direction 10 of the electric field (with reference to FIG. 3).

As the liquid crystal display unit according to the first embodiment of the present invention is provided with lens films 2a and 2b as shown in FIG. 1, light 17, which is directed from back light member 1 and travels in the direction which is diagonal to the surface of liquid crystal display 3, turns to light 18 which travels in a direction almost perpendicular to the surface of liquid crystal display 3. Thus, the quantity of the diagonally directed leakage light decreases also in light 19 transmitted through liquid crystal display 3.

Figure 4:
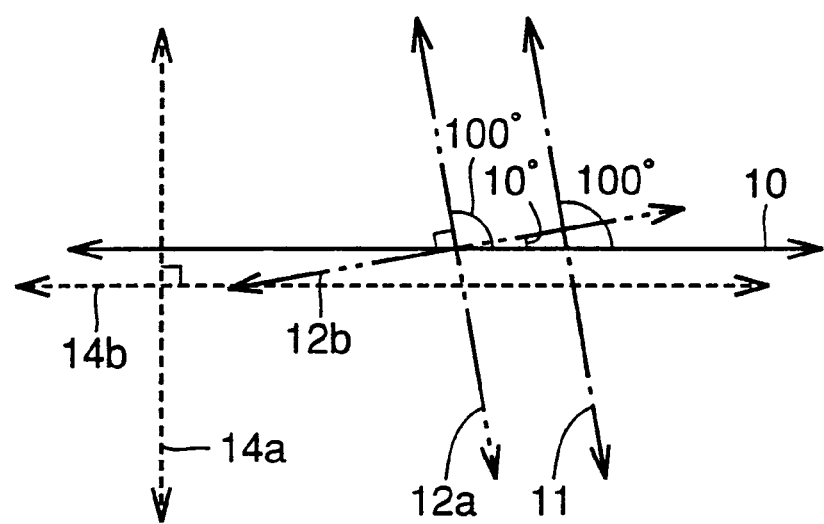
FIG. 4 is a diagram showing a relation between an electric field direction, an orientation direction of a liquid crystal molecule, a transmission axis direction of a polarizer and a condensing direction of a lens film in the liquid crystal display unit shown in FIG. 1.

FIG. 4 shows a relation between the electric field direction, orientation direction of the liquid crystal molecule, transmission axis direction of the polarizer and the condensing direction of the lens film.

Referring to FIG. 4, an orientation direction (rubbing direction) 11 of liquid molecules 8a and 8b (with reference to FIG. 3) is set to form an angle of about 100° with respect to electric field direction 10. A transmission axis direction 12a of polarizer 4a (with reference to FIG. 2) is also set to form the angle of 100° with respect to electric field direction 10. A transmission axis direction 12b of polarizer 4b (with reference to FIG. 2) is set such that it is orthogonal to transmission axis direction 12a of polarizer 4a. Condensing directions 14a and 14b of lens films 2a and 2b are respectively set such that they are orthogonal to and almost parallel to electric field direction 10.

As shown in FIG. 1 , back light member 1 may be provided immediately below the liquid crystal display. Alternatively, a back light member of a side light type may be used which has a projecting plate and a light source arranged on the side surface of the projecting plate.

The lens film will be described with reference to FIG. 5.

Figure 5:
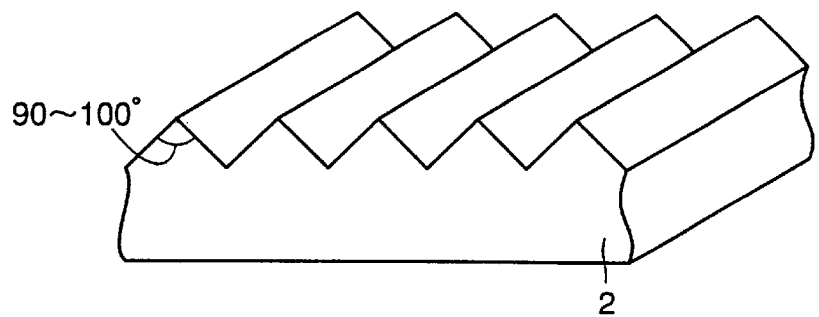
FIG. 5 is a diagram showing the lens film of the liquid crystal display unit shown in FIG. 1.

Referring to FIG. 5, linear protrusions are formed in the surface of lens film 2 extending almost in the same direction. The cross section of the protrusion shown in FIG. 5 is generally in an rectangular form with an apex angle of 90° to 100°. Polycarbonate is used for lens film 2.

As such protrusion having a generally rectangular cross section is formed in the surface of lens film 2, the direction of the light directed to the protrusion changes. As a result, lens film 2 is provided with a function of condensing light.

Figure 6:
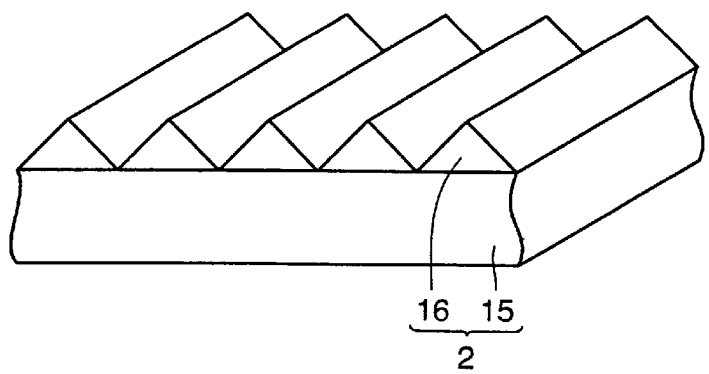
FIGS. 6 and 7 are diagrams respectively showing first and second modifications of the lens film shown in FIG. 5.

Referring to FIG. 6, a first modification of the lens film is provided with a base 15 and a surface structure 16 having the function of condensing light. The shape of the surface and cross section of lens film 2 shown in FIG. 6 are basically the same as those of the lens film 2 shown in FIG. 5. Therefore, a similar effect can be obtained as in the case of the lens film 2 shown in FIG. 5.

Figure 7:
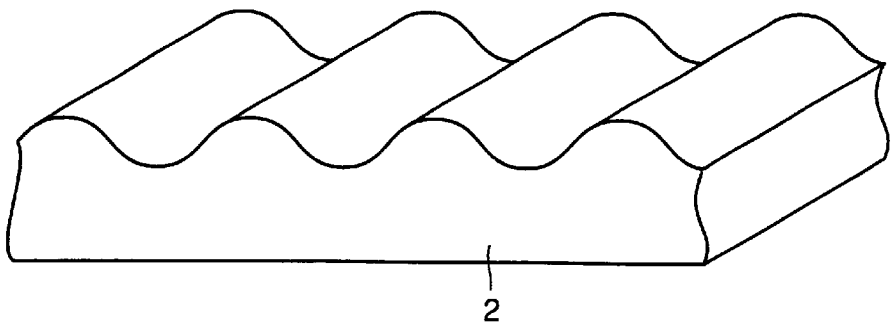

Referring to FIG. 7, a second modification of the lens film is basically provided with the same structure as that of lens film 2 shown in FIG. 5, except that the cross section of its surface protrusion is generally in a semicircular form. A similar effect can also be obtained as in the case of the lens film 2 shown in FIG. 5 with such structure.

Figure 3:
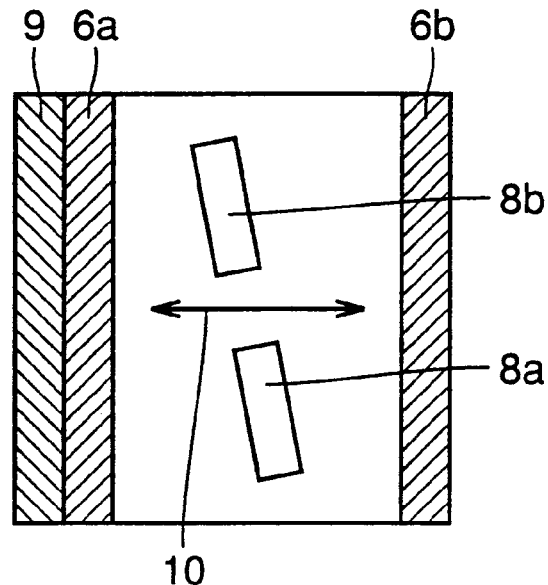
FIG. 3 is a schematic plan view of the liquid crystal display shown in FIG. 2.
Figure 8:
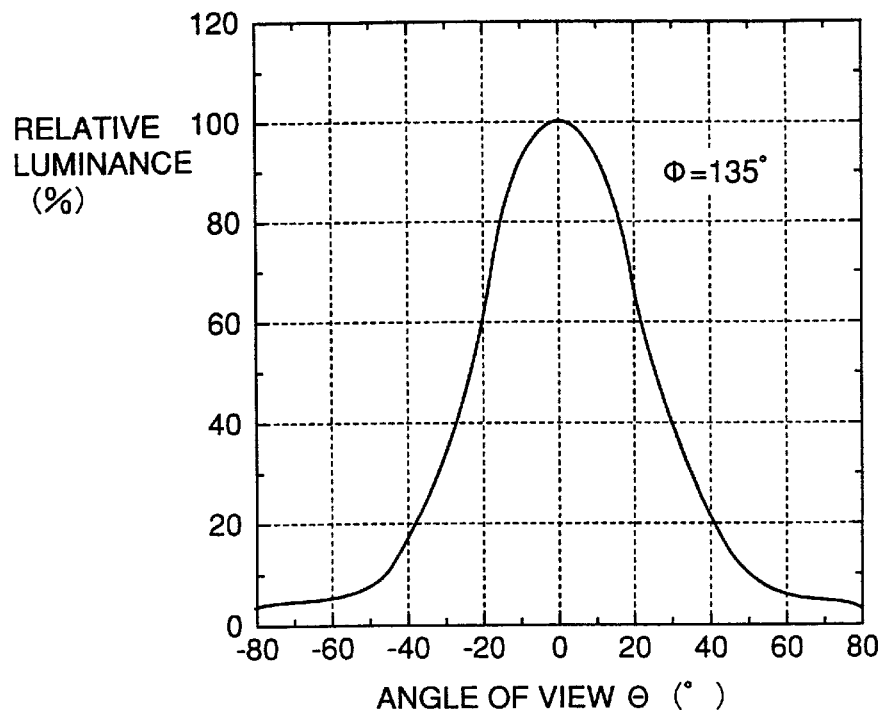
FIG. 8 is a graph showing a relation between a relative luminance and an angle of view when azimuth $\Phi=135°$ in the case of a white screen in the liquid crystal display unit shown in FIG. 1.

For the liquid crystal display unit shown in FIG. 1, a relation between a relative luminance and an angle of view is measured in the case of a white screen when viewed in the direction which forms an azimuth Φ of 135° with respect to electric field direction 10 (with reference to FIG. 3). The result is shown in FIG. 8.

Figure 9:
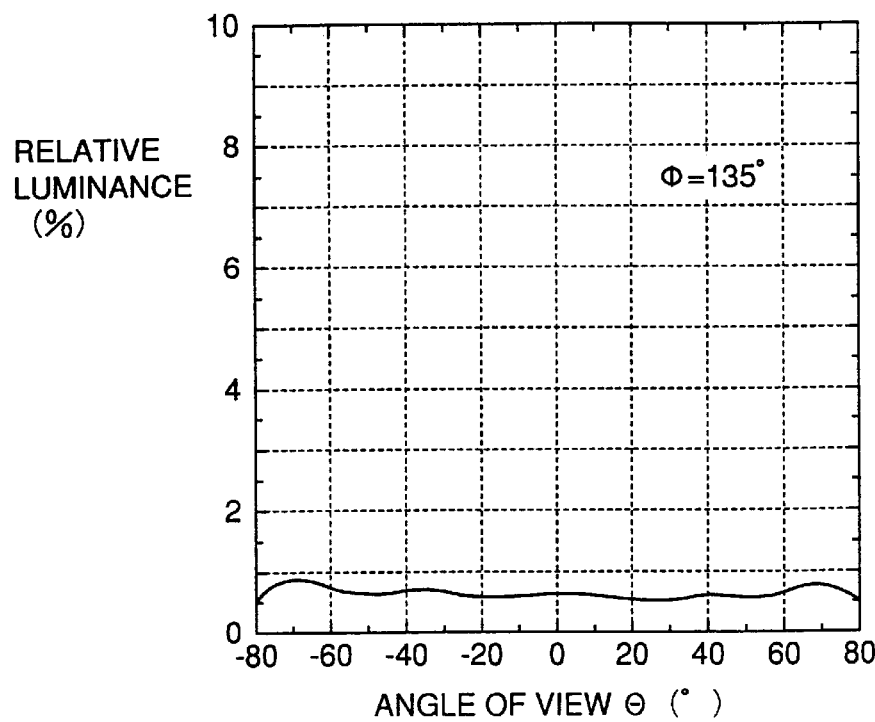
FIG. 9 is a graph showing a relation between the relative luminance and the angle of view when azimuth $\Phi=135°$ in the case of the a black screen in the liquid crystal display unit shown in FIG. 1.

Referring to FIG. 9, even around points at which an angle of view Θ=±60°, at which points the relative luminance has conventionally been increased due to leakage light, the relative luminance does not change and is maintained at a sufficiently low level. In addition, the decrease in leakage light alleviates the problem of the light which appears yellow around the points at which Θ=±60°. Thus, uniformity of luminance and color in the case of the black screen in the liquid crystal display unit is remarkably enhanced.

Figure 10:
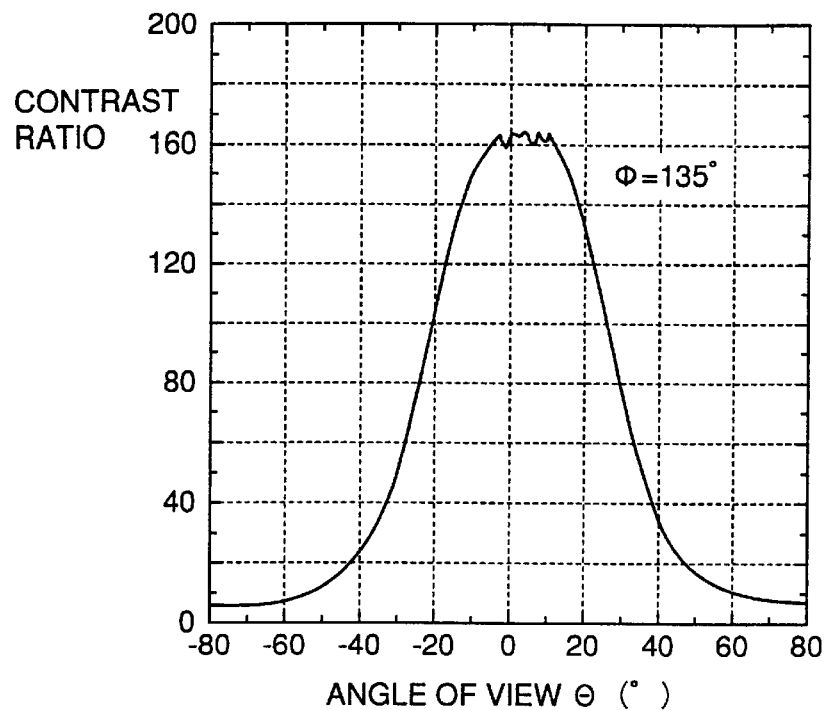
FIG. 10 is a graph showing a relation between a contrast ratio and the angle of view when azimuth $\Phi=135°$ in the liquid crystal display unit shown in FIG. 1.

Referring to FIG. 10, the contrast ratio when Θ=±0° (when viewed almost perpendicularly with respect to the liquid crystal display unit) is about 160, which has considerably been increased as compared with that of the conventional liquid crystal display unit.

SECOND EMBODIMENT

In a liquid crystal display unit according to the second embodiment of the present invention, a lens film which is lower in the degree of condensing than that used for in the first embodiment is used for lens films 2a and 2b in a structure which is similar to that of the first embodiment shown in FIG. 1. The light direction of lens films 2a and 2b are basically the same as those of the liquid crystal display unit according to the first embodiment shown in FIG. 1.

Then, for the liquid crystal display unit according to the second embodiment, a relation between a relative luminance and an angle of view as well as that between a contrast ratio and the angle of view are measured as in the first embodiment. The result is shown in FIGS. 11 to 13.

Figure 11:
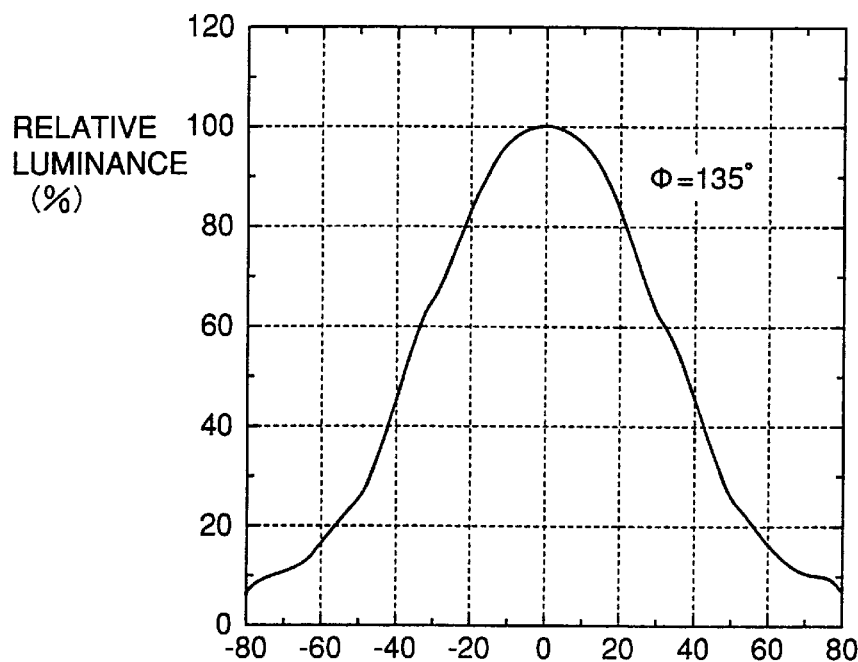
FIG. 11 is a graph showing a relation between a relative luminance and an angle of view when azimuth $\Phi=135°$ in the case of a white screen in a second embodiment of the liquid crystal display unit according to the present invention.

As shown in FIG. 11, the relative luminance in regions having large angles of view in the liquid crystal display unit according to the second embodiment is more or less higher than that according to the first embodiment shown in FIG. 8 as the lens film which is lower in the degree of light condensing is used.

Figure 12:
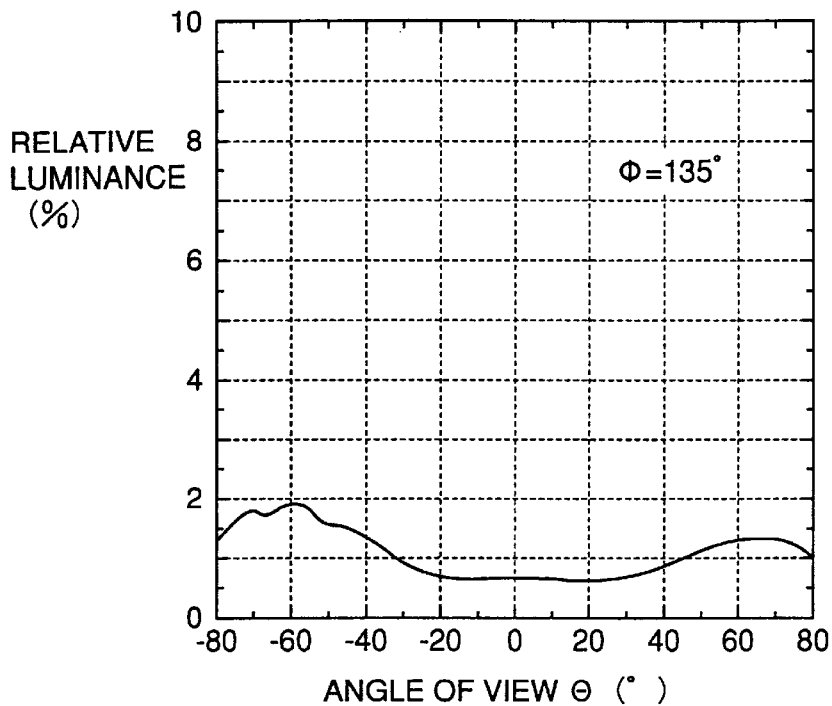
FIG. 12 is a graph showing a relation between the relative luminance and the angle of view when azimuth $\Phi=135°$ in the case of the a black screen in the second embodiment of the liquid crystal display unit according to the present invention.

As shown in FIG. 12, although the relative luminance around the point at which Θ=±60° is more or less higher than that around the point at which Θ=0°, it is still sufficiently low and a similar effect is obtained as in the case of the liquid crystal display unit according to the first embodiment of the present invention.

Figure 13:
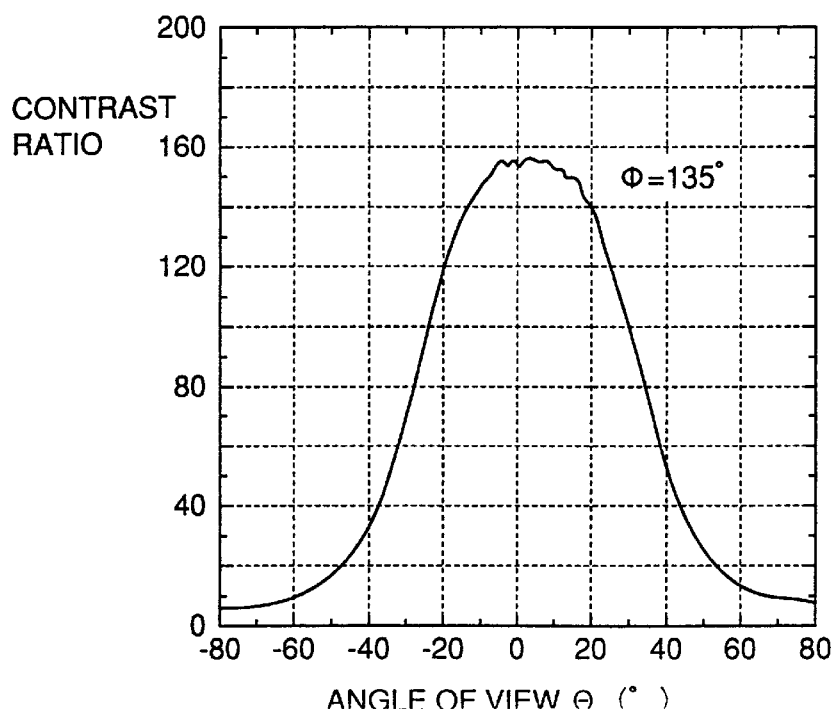
FIG. 13 is a graph showing a relation between a contrast ratio and an angle of view when azimuth $\Phi=135°$ in the second embodiment of the liquid crystal display unit according to the present invention.

As shown in FIG. 13, the contrast ratio around the point at which Θ=0° is about 155, which is sufficiently high.

THIRD EMBODIMENT

Figure 14:
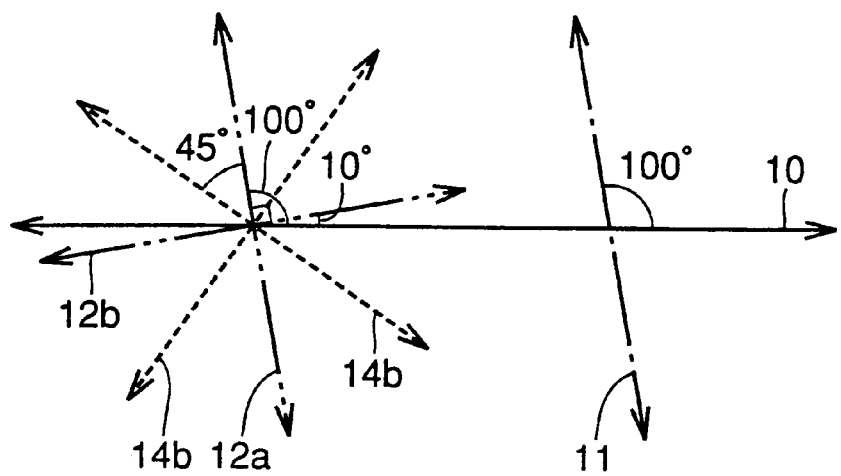
FIG. 14 is a diagram showing a relation between an electric field direction, an orientation direction of a liquid crystal molecule, a transmission axis direction of a polarizer and a condensing direction of a lens film in a third embodiment of the liquid crystal display unit according to the present invention.

A liquid crystal display unit according to the third embodiment of the present invention is basically provided with the same structure as that of the liquid crystal display unit according to the first embodiment shown in FIG. 1. In the liquid crystal display unit according to the third embodiment, however, light condensing directions 14a and 14b of lens films are respectively set to form an angle of 45° with respect to transmission axis directions 12a and 12b of polarizer 4a and 4b (with reference to FIG. 1) as shown in FIG. 14.

Here, in polarizer 4a or 4b, light which is diagonally directed from an azimuth which forms an angle of 45° or 135° with respect to its transmission axis is most likely to be transmitted as leakage light. Thus, by setting light condensing directions 14a and 14b of the lens films such that they form the angle of 45° with respect to transmission axis directions 12a and 12b of the polarizer, respectively, the light diagonally directed from the azimuth which most likely allows generation of leakage light is condensed and the direction thereof can be changed. Thus, a quantity of light diagonally directed from a liquid crystal display can be decreased in the azimuth which forms the angle of 45° or 135° with respect to the transmission axis. As a result, uniformity of luminance and color in the case of the black screen is more remarkably enhanced.

FOURTH EMBODIMENT

Figure 15:
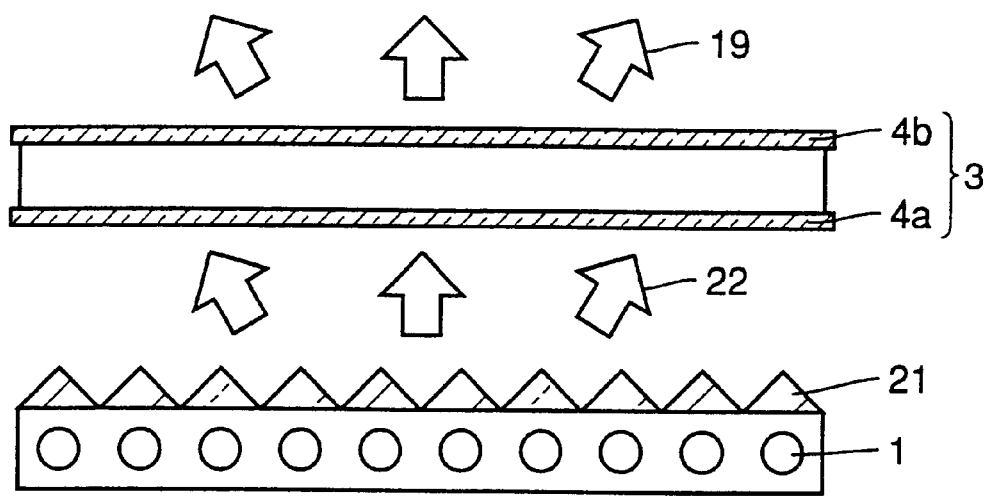
FIGS. 15 and 16 are schematic cross-sectional views respectively showing fourth and fifth embodiments of the liquid crystal display unit according to the present invention.

As shown in FIG. 15, the liquid crystal display unit is provided with a structure which is basically the same as that in the case of the liquid crystal display unit according to the first embodiment shown in FIG. 1. However, the liquid crystal display unit shown in FIG. 15 is provided with a function of condensing light in a processed back light member surface 21 which is obtained from processing the surface of back light member 1 instead of inserting lens films between the liquid crystal display 3 and back light member 1. Thus, light directed from the back light member turns to light 22 which is condensed almost perpendicularly to liquid crystal display 3 as it passes through processed back light member surface 21. As result, a similar effect can be obtained as in the case of the liquid crystal display unit according to the first embodiment of the present invention shown in FIG. 1.

FIFTH EMBODIMENT

Figure 16:
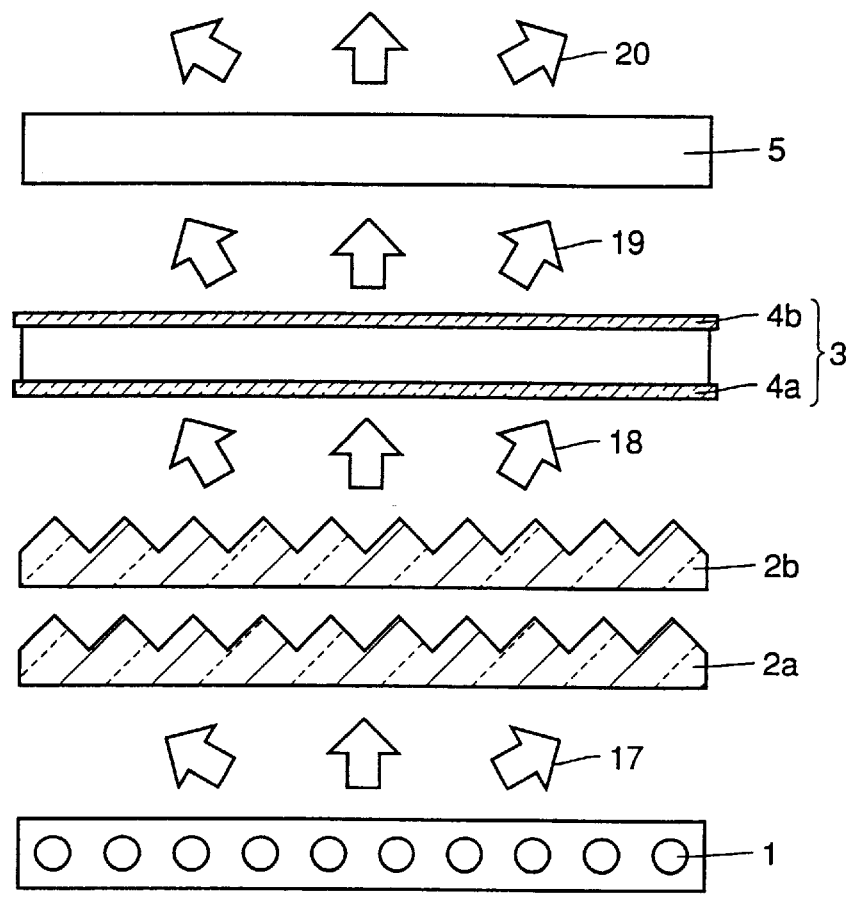

As shown in FIG. 16, the liquid crystal display unit is provided with a structure which is basically the same as that in the case of the liquid crystal display unit according to the first embodiment shown in FIG. 1. However, the liquid crystal display unit shown in FIG. 16 includes a scattering film 5 provided above a liquid crystal display 3. Scattering film 5 has a function of changing the part of light 19 which is to some degree aligned in the direction perpendicular to the surface of liquid crystal display 3 to light 20 having a component which also travels diagonally with respect to the surface of liquid crystal display 3.

Thus, the similar effect as in the case of the liquid crystal display unit according to the first embodiment is obtained by provision of lens films 2a and 2b and, at the same time, the part of light 19 transmitted through liquid crystal display 3 turns to light 20 having a component which diagonally travels with respect to the surface of liquid crystal display 3. As a result, sufficient luminance can be obtained when the liquid crystal display unit is viewed from a large angle of view.

Figure 17:
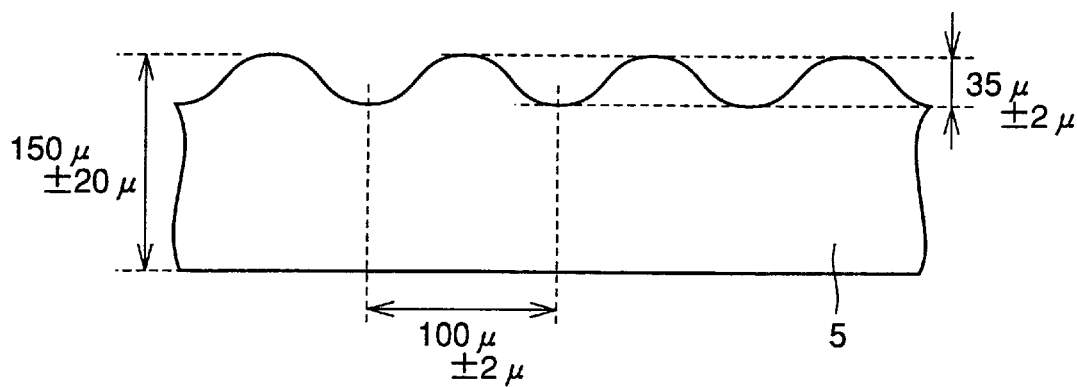
FIG. 17 is a schematic cross-sectional view showing a scattering film of the liquid crystal display unit shown in FIG. 16.
Figure 18:
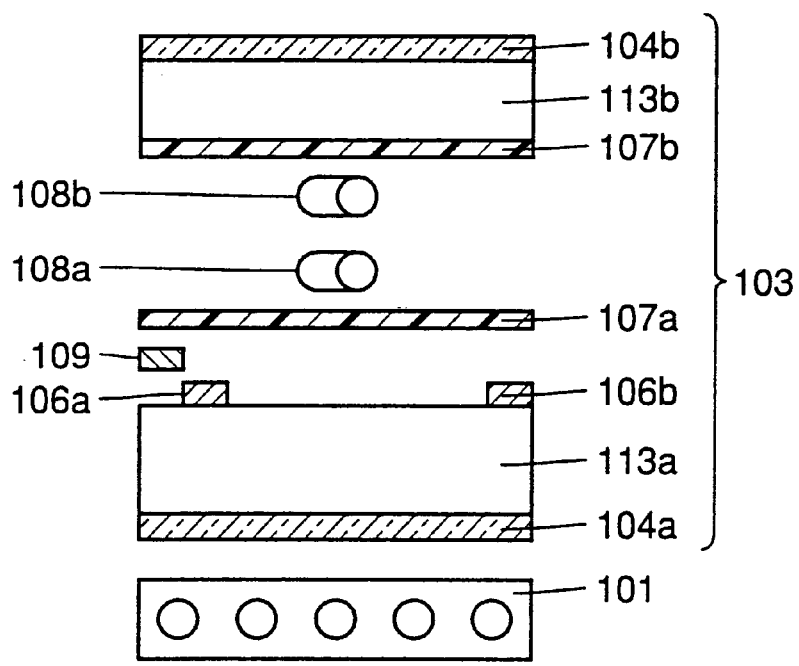
FIG. 18 is a schematic cross-sectional view showing a conventional liquid crystal display unit.
Figure 19:
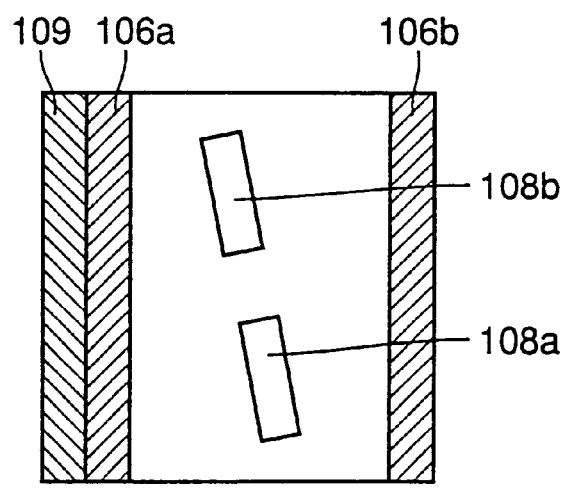
FIG. 19 is a schematic plan view of the liquid crystal display unit shown in FIG. 18.
Figure 20:
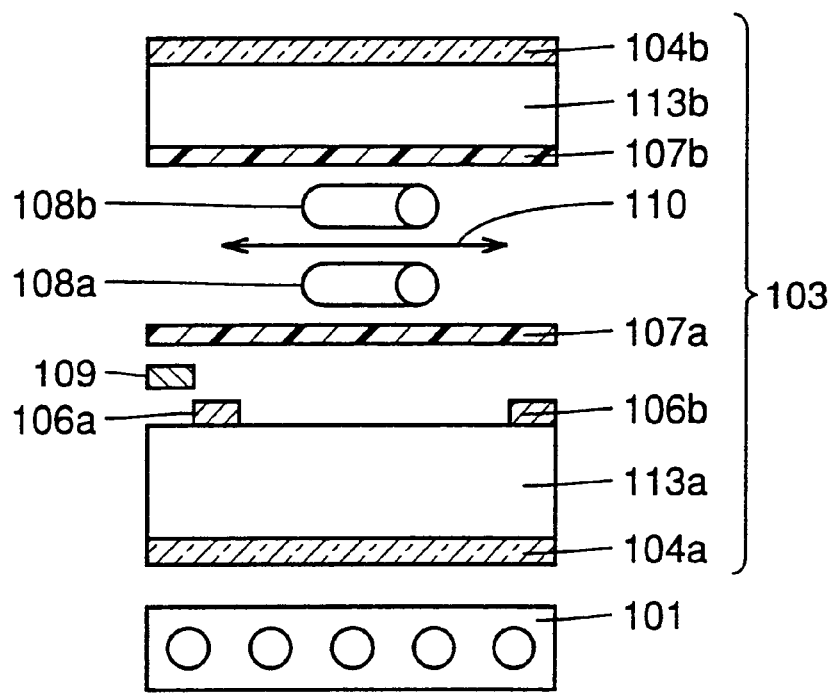
FIG. 20 is a schematic cross-sectional view showing the conventional liquid crystal display unit, where a voltage is applied to an electrode.
Figure 21:
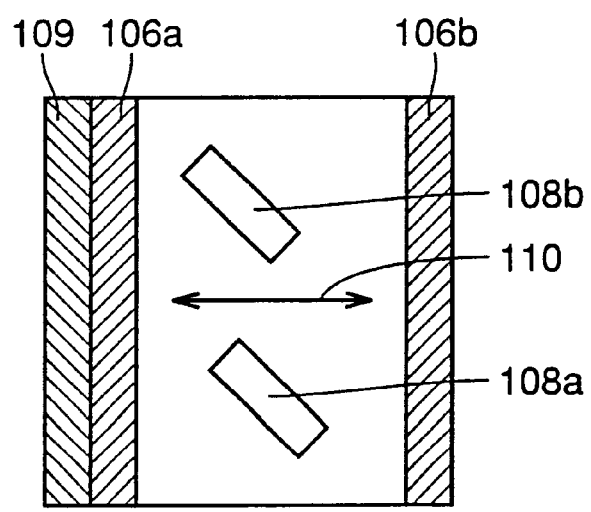
FIG. 21 is a schematic plan view showing the liquid crystal display unit shown in FIG. 20.
Figure 22:
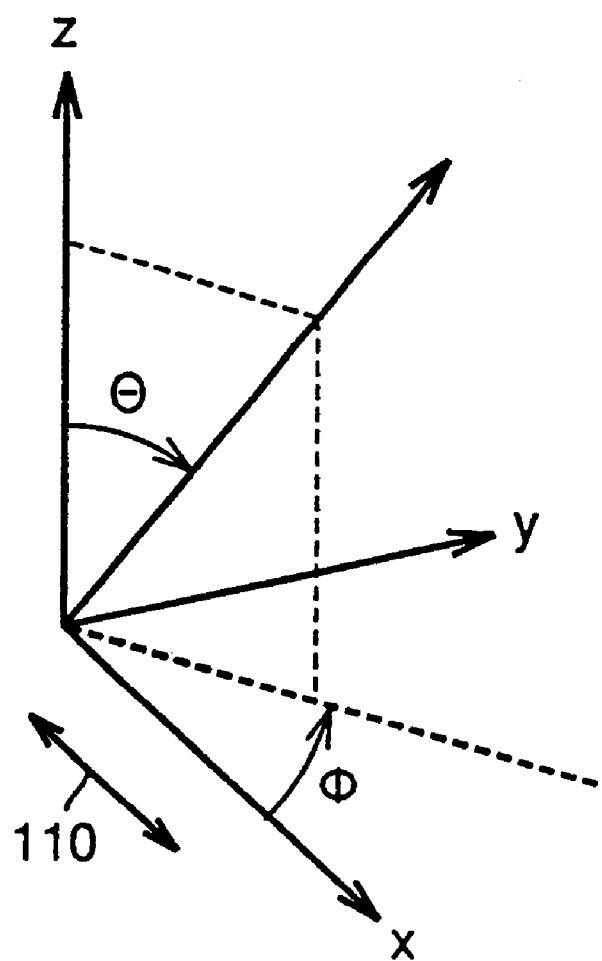
FIG. 22 is a diagram showing a relation between an angle of view Θ and a direction of an electric field formed in the conventional liquid crystal display unit
Figure 23:
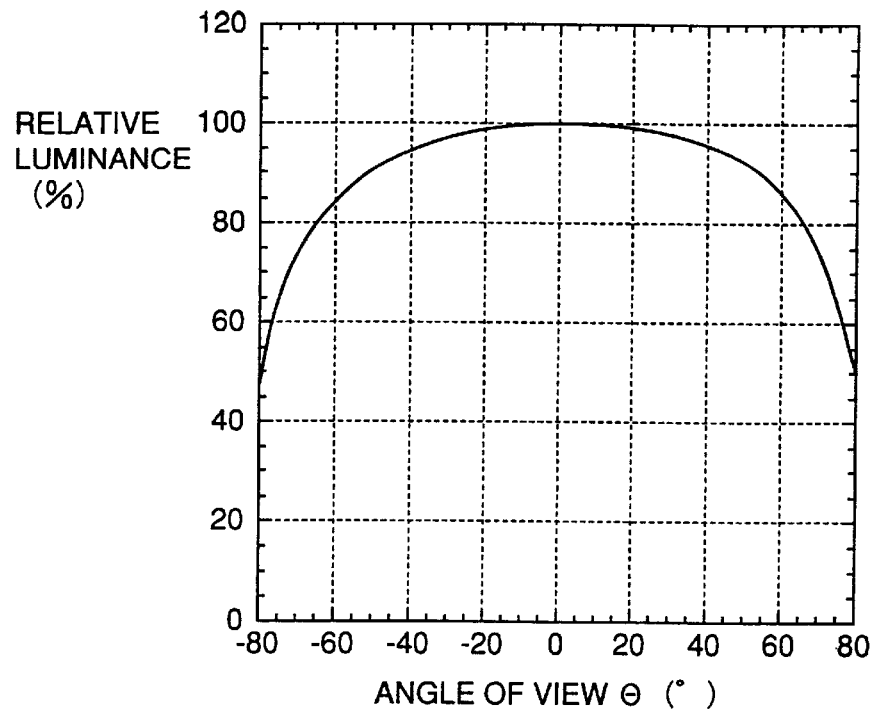
FIG. 23 is a graph showing a relation between a relative luminance of light directed from a back light member and an angle of view.
Figure 24:
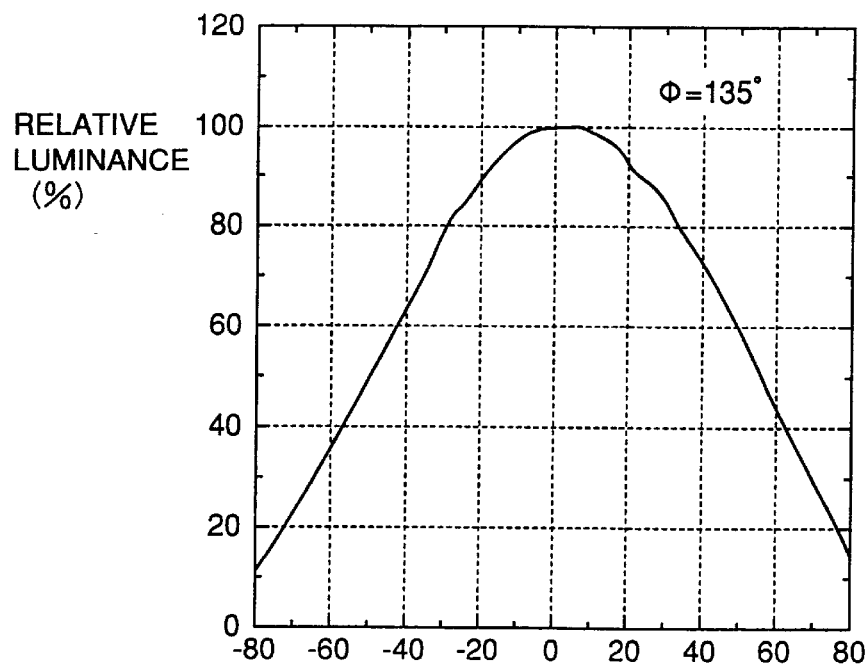
FIG. 24 is a graph showing a relation between the relative luminance and the angle of view in the case of a white screen in the conventional liquid crystal display unit.
Figure 25:
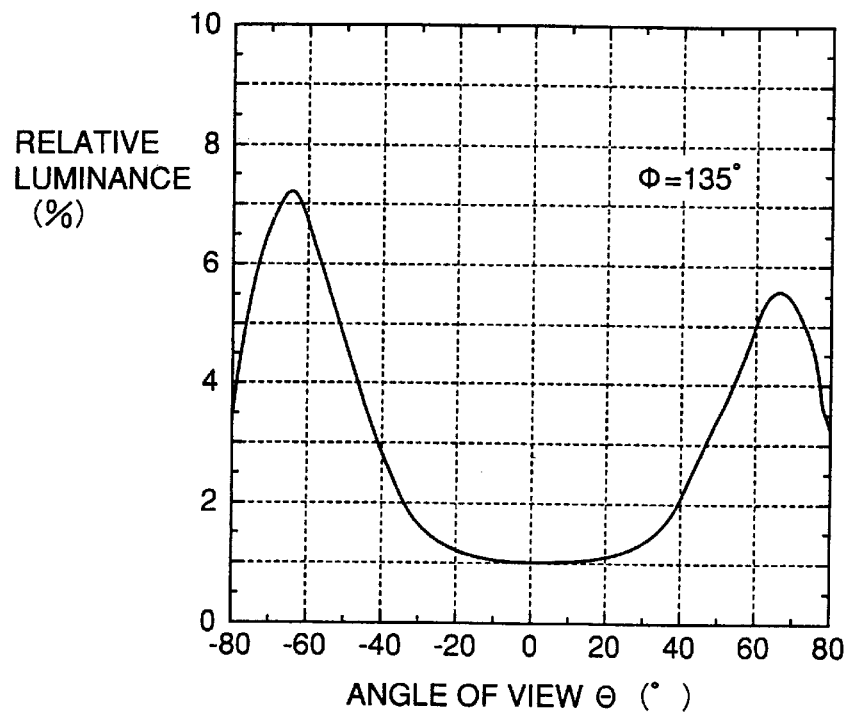
FIG. 25 is a graph showing a relation between the relative luminance and the angle of view in the case of a black screen in the conventional liquid crystal display unit.
Figure 26:
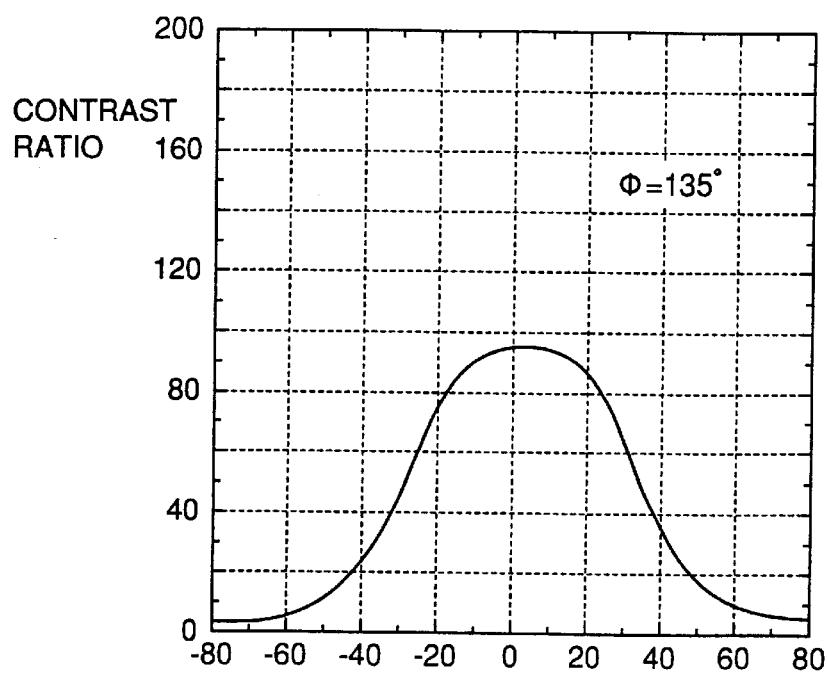
FIG. 26 is a graph showing a relation between a contrast ratio and an angle of view in the conventional liquid crystal display unit.
Figure 27:
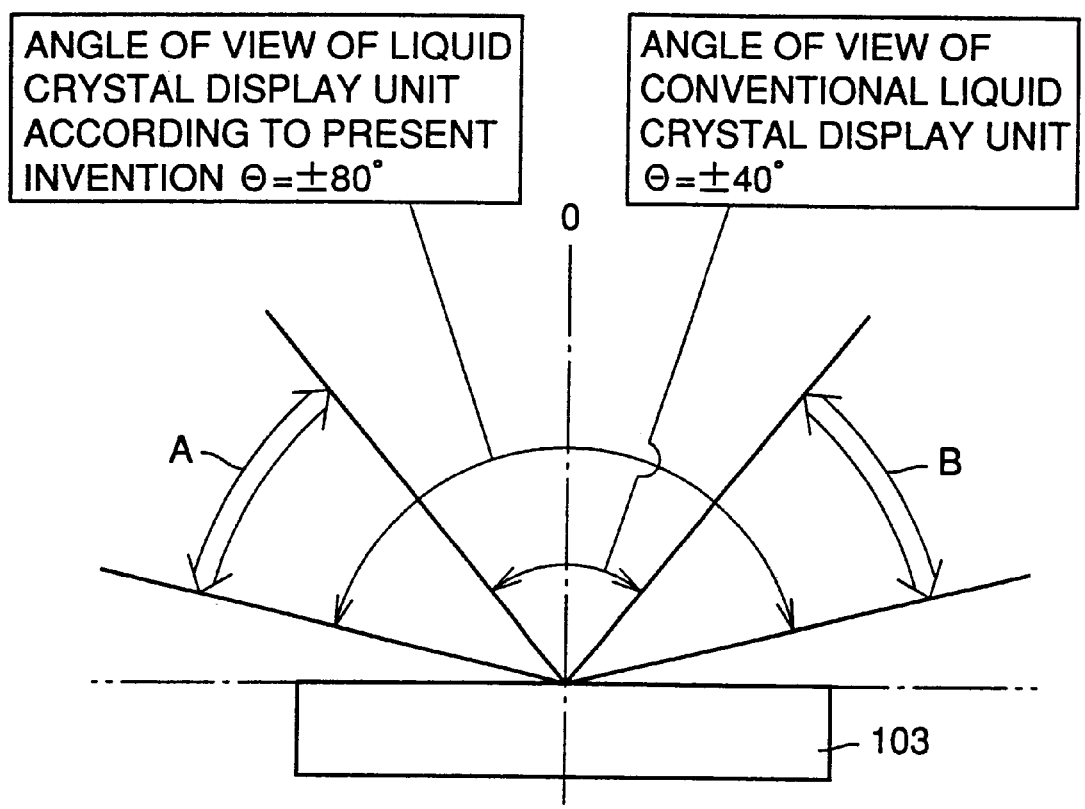
FIG. 27 is a diagram shown in conjunction with the problem of a region with a large angle of view according to the present invention.

As shown in FIG. 17, scattering film 5 has in its surface a plurality of protrusions. The cross section of the protrusion is semicircular. The height and width of the protrusion is 35 μm±2 μm and 100 μm±2 μm, respectively. A thickness of scattering film 5 is 150 μm±20 μm. Polycarbonate is used as a material.

Such structure allows light 19 (with reference to FIG. 16) transmitted through liquid crystal display 3 (with reference to FIG. 16) to be scattered for obtaining light 20 (with reference to FIG. 16) travelling diagonally with respect to the surface of liquid crystal display 3.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A liquid crystal display, comprising:
   a liquid crystal panel having a display surface and a back surface, said liquid crystal panel including:
   a pair of substrates;
   a liquid crystal molecule held between said pair of substrates;
   first and second electrodes arranged substantially in parallel with each other forming an electric field approximately in parallel with said display surface, wherein said liquid crystal molecule is driven by said electric field;
   a backlight; and
   an optical element positioned between said backlight and said liquid crystal panel, wherein said optical element condenses light from said backlight in a direction substantially perpendicular to said display surface for directing said light to said liquid crystal panel, and said optical element reduces the amount of leakage light diagonally directed to the display surface of said liquid crystal panel when an image on said liquid crystal panel is black;
   wherein a surface of said optical element is structured such that a value of relative luminance of light emitted from the display surface of said liquid crystal panel with an angle of approximately 60° with respect to a normal direction of the display surface of the liquid crystal panel in a case of black screen in an azimuth different from an orientation direction of said liquid crystal display is at most 2%.

2. The liquid crystal display unit according to claim 1, wherein
   said liquid crystal panel includes a polarizing member having a transmission axis, and
   said optical element decreases the quantity of light diagonally directed to said liquid crystal display with an azimuth angle different from an azimuthal angle of a transmission axis of said polarizing member.

3. The liquid crystal display unit according to claim 2, wherein said azimuthal angle of said diagonally directed light forms an angle of 45° or 135° with respect to said transmission axis.

4. The liquid crystal display unit according to claim 3, wherein said optical element includes an orientation changing member for changing a direction of said diagonally directed light to a direction almost perpendicular to said display surface.

5. The liquid crystal display unit according to claim 4, wherein said orientation changing member is a condenser film.

6. The liquid crystal display unit according to claim 4, further comprising
   a light conducting plate formed on the side of the back surface of said liquid crystal panel, and
   said orientation changing member being formed by processing a surface of said light conducting plate.

7. The liquid crystal display unit according to claim 4, further comprising
   a light scattering member formed on a side of said display surface of said liquid crystal panel.

8. A liquid crystal display unit of claim 2, wherein an angle formed between a direction in which the optical element collects light and said transmission axis is about 10° or 80°.

9. The liquid crystal display unit according to claim 8, wherein said optical element includes an orientation changing member for changing a direction of said diagonally directed light to a direction almost perpendicular to said display surface.

10. The liquid crystal display unit according to claim 9, wherein said orientation changing member is a condenser film.

11. The liquid crystal display unit according to claim 9, further comprising:
    a light conducting plate formed on the side of the back surface of said liquid crystal panel, and
    said orientation changing member being formed by processing a surface of said light conducting plate.

12. The liquid crystal display unit according to claim 9, further comprising:
    a light scattering member formed on a side of said display surface of said liquid crystal panel.

13. The liquid crystal display unit according to claim 1, wherein
    said optical element includes an orientation changing member for changing a direction of said diagonally directed light to a direction almost perpendicular to said display surface.

14. The liquid crystal display unit according to claim 13, wherein said orientation changing member is a condenser film.

15. The liquid crystal display unit according to claim 13, further comprising
    a light conducting plate formed on the side of said back surface of said liquid crystal panel, and
    said orientation changing member being formed by processing a surface of said light conducting plate.

16. The liquid crystal display unit according to claim 13, further comprising
    a light scattering member formed on a side of said display surface of said liquid crystal panel.

17. The liquid crystal display unit according to claim 1, further comprising
    a light scattering member formed on a side of said display surface of said liquid crystal panel.

18. The liquid crystal display unit according to claim 1, wherein said substrate is a glass substrate having a surface almost parallel to said display surface, and
    said first and second electrodes are formed on said surface of said glass substrate almost parallel to each other.

19. A liquid crystal display unit of claim 1, further including a plurality of optical elements, wherein each respective optical element collects light from different directions.

20. A liquid crystal display unit of claim 19, wherein each respective optical element collects light from substantially orthogonal directions.

21. The liquid crystal display according to claim 1, wherein the value of relative luminance of light emitted from the display surface of said liquid crystal panel with the angle of approximately 60° with respect to the normal direction of the display surface of the liquid crystal panel in a case of black screen in the azimuth different from the orientation direction of said liquid crystal display is at most 1%.

22. A liquid crystal display, comprising:
a liquid crystal panel having a display surface and a back surface, said liquid crystal panel including:
a pair of glass substrates;
a liquid crystal molecule held between said pair of substrates;
first and second electrodes arranged substantially in parallel with each other forming an electric field approximately in parallel with said display surface, wherein said liquid crystal molecule is driven by said electric field;
a backlight; and
an optical element positioned between said backlight and said liquid crystal panel, wherein said liquid crystal panel includes first and second electrodes substantially parallel with each other on a surface of one of said pair of substrates, said optical element condenses light from said backlight in a direction substantially perpendicular to said display surface for directing said light to said liquid crystal panel, and said optical element reduces the amount of leakage light diagonally directed to the display surface of said liquid crystal panel when an image on said liquid crystal panel is black;
wherein a surface of said optical element is structured such that a value of relative luminance of light emitted from the display surface of said liquid crystal panel with an angle of approximately 60° with respect to a normal direction of the display surface of the liquid crystal panel in a case of black screen in an azimuth different from an orientation direction of said liquid crystal display is at most 2%.

23. The liquid crystal display unit according to claim 22, wherein said liquid crystal panel includes a polarizing member having a transmission axis, and
said optical element decreases the quantity of light diagonally directed to said liquid crystal display with an azimuthal angle different from an azimuthal angle of a transmission axis of said polarizing member.

24. The liquid crystal display unit according to claim 22, wherein
said optical element includes an orientation changing member for changing a direction of said diagonally directed light to a direction almost perpendicular to said display surface.

25. The liquid crystal display unit according to claim 22, further comprising
a light scattering member formed on a side of said display surface of said liquid crystal panel.

26. A liquid crystal display unit of claim 22, wherein said liquid crystal panel includes a polarizing member having a transmission axis, and
wherein an angle formed between a direction in which the optical element collects light and said transmission axis is about 10° or 80°.

27. A liquid crystal display unit of claim 22, further including a plurality of optical elements, wherein each respective optical element collects light from different directions.

28. A liquid crystal display unit of claim 22, further including a plurality of optical elements, wherein each respective optical element collects light from substantially orthogonal directions.

29. The liquid crystal display according to claim 22, wherein the value of relative luminance of light emitted from the display surface of said liquid crystal panel with the angle of approximately 60° with respect to the normal direction of the display surface of the liquid crystal panel in a case of black screen in the azimuth different from the orientation direction of said liquid crystal display is at most 1%.

30. A liquid crystal display, comprising:
a liquid crystal panel having a display surface and a back surface, said liquid crystal panel including:
a pair of substrates;
a liquid crystal molecule held between said pair of substrates;
first and second electrodes arranged approximately in parallel with each other forming an electric field approximately in parallel with said display surface, wherein said liquid crystal molecule is driven by said electric field;
a backlight; and
an optical element positioned between said backlight and said liquid crystal panel, wherein said optical element condenses light from said backlight in a direction substantially perpendicular to said display surface for directing said light to said liquid crystal panel, and said optical element reduces the amount of leakage light diagonally directed to the display surface of said liquid crystal panel when an image on said liquid crystal panel is black;
wherein a surface of said optical element is structured such that a value of relative luminance of light emitted from the display surface of said liquid crystal panel with an angle of approximately 60° with respect to a normal direction of the display surface of the liquid crystal panel in a case of black screen in an azimuth of 35° with respect to an orientation direction of said liquid crystal display is at most 2%.

31. The liquid crystal display according to claim 30, wherein the value of relative luminance of light emitted from the display surface of said liquid crystal panel with the angle of approximately 60° with respect to the normal direction of the display surface of the liquid crystal panel in a case of black screen in the azimuth of 35° with respect to the orientation direction of said liquid crystal display is at most 1%.

32. A liquid crystal display, comprising:
a liquid crystal panel having a display surface and a back surface, said liquid crystal panel including:
a pair of glass substrates;
a liquid crystal molecule held between said pair of substrates;
first and second electrodes arranged approximately in parallel with each other forming an electric field approximately in parallel with said display surface, wherein said liquid crystal molecule is driven by said electric field;
a backlight; and
an optical element positioned between said backlight and said liquid crystal panel, wherein said liquid crystal panel includes first and second electrodes substantially parallel with each other on a surface of one of said pair of substrates, said optical element condenses light from said backlight in a direction substantially perpendicular to said display surface for directing said light to said liquid crystal panel, and said optical element reduces the amount of leakage light diagonally directed to the display surface of said liquid crystal panel when an image on said liquid crystal panel is black;

wherein a surface of said optical element is structured such that a value of relative luminance of light emitted from the display surface of said liquid crystal panel with an angle of approximately 60° with respect to a normal direction of the display surface of the liquid crystal panel in a case of black screen in an azimuth of 35° with respect to an orientation direction of said liquid crystal display is at most 2%.

33. The liquid crystal display according to claim 32, wherein the value of relative luminance of light emitted from the display surface of said liquid crystal panel with the angle of approximately 60° with respect to the normal direction of the display surface of the liquid crystal panel in a case of black screen in the azimuth of 35° with respect to the orientation direction of said liquid crystal display is at most 1%.

* * * * *